K. Freeman,
Sawing Shingles,
No 20,704.        Patented June 29, 1858.
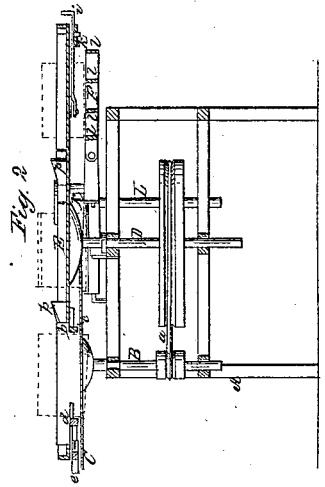
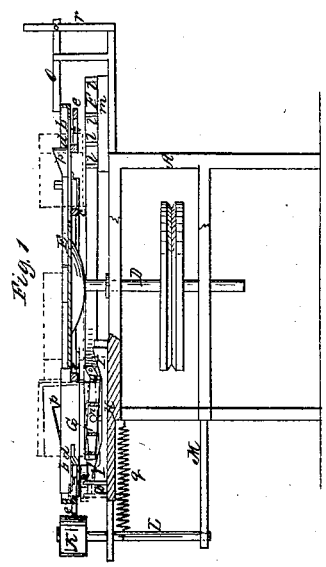
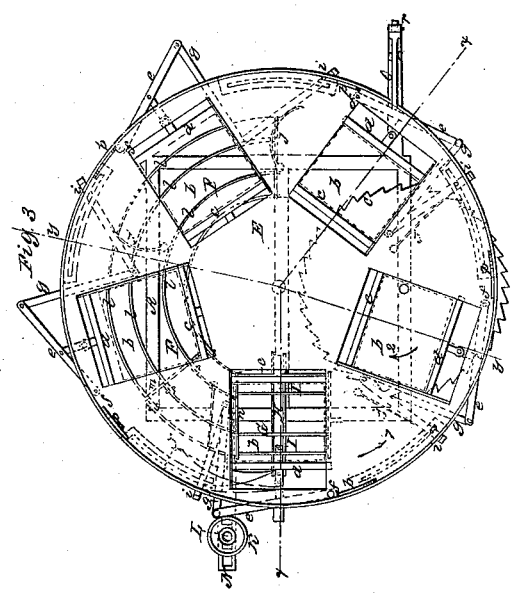

UNITED STATES PATENT OFFICE.

K. FREEMAN, OF FOND DU LAC, WISCONSIN.

ROTARY SHINGLE-MACHINE.

Specification of Letters Patent No. 20,704, dated June 29, 1858.

*To all whom it may concern:*

Be it known that I, K. FREEMAN, of Fond du Lac, in the county of Fond du Lac and State of Wisconsin, have invented a new and Improved Machine for Sawing Shingles; and I do hereby declare that the following is a full, clear, and exact description of the same, reference being had to the annexed drawings, making a part of this specification, in which—

Figure 1, is a vertical section of my improvement taken in the line $x$, $x$, Fig. 3. Fig. 2, is a vertical section of ditto, taken in the line $y$, $y$, Fig. 3. Fig. 3, is a plan or top view of ditto.

Similar letters of reference indicate corresponding parts in the several figures.

This invention consists in the employment or use of a horizontal rotating carriage, circular saw, setting plate or bed and dogs, arranged substantially as hereinafter fully shown and described, whereby shingles may be sawed in proper taper form from a series of bolts in an expeditious and perfect manner.

To enable those skilled in the art to fully understand and construct my invention I will proceed to describe it.

A, represents a rectangular frame at one side of which a vertical arbor B, is placed, said arbor having a circular saw C, attached to its upper end.

D, is a vertical arbor which is placed centrally within the frame A, and from which the arbor B, is driven by a belt $a$.

On the upper end of the arbor D, a circular plate E, is placed. This plate has a series of square openings $b$, made through it, each opening being provided with two jaws $c$, $d$, the jaws $c$, being stationary and formed of bars placed near the inner ends of the openings the bars being corrugated at their face sides. The other jaws $d$, are formed of bars which are arranged so that they may slide in the openings, said bars being pivoted to levers $e$, having their fulcra at $f$, at one side and at the outer ends of the openings, the opposite ends of the levers being pivoted to levers $g$, which work in guides attached to the under side of the plate E. To the inner ends of the levers $g'$ levers $i$, are attached, the levers $i$, having springs $j$, bearing against them. The outer ends of the levers $i$, are bent upward and they work within guides $k$, attached to the under side of the plate E.

F, is a semi-circular horizontal bed, attached to the upper part of the frame A, and extending underneath three of the openings $b$. This bed may be formed of a series of curved rods or plates $l$, secured in transverse plates or bars $m$, on the frame.

At one end of the bed F a tilting plate or bed G, is placed. This bed may be constructed similarly to the bed F, with the exception that its sides are pivoted at the center as shown at $n$, so that it may be inclined or tilted to assume two different positions as indicated in black and blue Fig. 1. Underneath the bed G a slide H, is placed, said slide having an inclined plane I, at each end as shown clearly in Fig. 1. To the outer end of the slide H, a vertical pin $o$, is attached. To the under side of the plate E, near its periphery an arm J, is pivoted, said arm being of curved taper form as indicated by blue dotted lines in Fig. 3.

To the upper surface of the plate E, at its periphery a series of inclined projections $p$, are attached. These projections are attached to the plate just back of the bent ends of the levers $i$.

K, is a friction roller which is placed on the upper end of a lever L, the lower end of which is stepped in an arm M, connected with the frame A, the upper end of said lever passing through a slot in an arm N, attached to the framing, said shaft having a spiral spring $q$, attached to it, which spring has a tendency to keep the roller inward toward the plate E.

O, is an arm which is attached to the upper part of a vertical rod $r$, attached to the frame A, the inner end of said arm projecting over the edge of the plate.

The operation is as follows:—The bolts shown in red, are got out of the proper size, and the plate E, is rotated in the direction indicated by arrow 1, the saw rotating in the direction indicated by arrow 2. The bolts are placed in three of the openings $b$, those that are directly over the bed F, and motion is given the shaft D, in any proper manner. As the several openings $b$, pass over the bed G, said bed is tilted by the arm J, said arms striking the pin $o$, and actuating the slide H, so that the inclined planes will tilt the platform, the slide being moved alternately inward and outward as the plate E, rotates, so that the bed G, will be tilted alternately in opposite directions. As the levers e, pass the roller K, they are forced inward and the bolts are clasped and held firmly while they are passed over the saw C, the latter cutting the shingles from the bolts in taper form owing to the inclination given the same by the tilting bed G, and as the bed G, is tilted in opposite positions the butts and thin ends of the shingles will be cut alternately from opposite ends of the bolts. The movable jaws d, are forced outward and the bolts freed from them as the bolts, pass on the bed F, in consequence of the ends of levers i, striking against the arm O, said arm being raised free from the levers i, after the latter are actuated, by means of the inclined projections p.

Having thus described my invention what I claim as new and desire to secure by Letters Patent, is,

The horizontal rotating plate or carriage E, circular saw C, stationary and setting beds F, G, and jaws c, d, in connection with the roller K, and arm O, the whole being arranged to operate substantially as and for the purpose set forth.

K. FREEMAN.

Witnesses:
E. DELANY,
R. A. DELANY.